(12) United States Patent
Yu

(10) Patent No.: US 9,047,058 B2
(45) Date of Patent: Jun. 2, 2015

(54) ELECTRONIC DEVICE WITH SUPPORT MECHANISM

(75) Inventor: Wen-Hua Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 219 days.

(21) Appl. No.: 13/568,252

(22) Filed: Aug. 7, 2012

(65) Prior Publication Data
US 2013/0250495 A1 Sep. 26, 2013

(30) Foreign Application Priority Data
Mar. 22, 2012 (CN) .......................... 2012 1 0077779

(51) Int. Cl.
*G06F 1/16* (2006.01)
(52) U.S. Cl.
CPC ............ *G06F 1/1679* (2013.01); *G06F 1/1681* (2013.01)
(58) Field of Classification Search
CPC ...................................................... G06F 1/166
USPC ..................................................... 361/679.59
See application file for complete search history.

(56) References Cited

U.S. PATENT DOCUMENTS

| | | | | |
|---|---|---|---|---|
| 5,239,444 | A * | 8/1993 | Sasaki | 361/679.12 |
| 5,469,327 | A * | 11/1995 | Cheng | 361/679.55 |
| 5,828,552 | A * | 10/1998 | Ma | 361/704 |
| 6,053,589 | A * | 4/2000 | Lin | 312/271 |
| 6,097,592 | A * | 8/2000 | Seo et al. | 361/679.55 |
| 6,097,595 | A * | 8/2000 | Cipolla | 361/679.21 |
| 7,566,043 | B2 * | 7/2009 | Chen | 248/616 |
| 7,746,636 | B2 * | 6/2010 | Tang | 361/679.55 |
| 7,821,786 | B2 * | 10/2010 | Hadad et al. | 361/679.59 |
| 7,855,883 | B2 * | 12/2010 | Tang | 361/679.55 |
| 8,220,771 | B2 * | 7/2012 | Wang | 248/685 |
| 2004/0264118 | A1 * | 12/2004 | Karidis et al. | 361/683 |
| 2008/0283711 | A1 * | 11/2008 | Wu et al. | 248/372.1 |
| 2009/0147469 | A1 * | 6/2009 | Chen et al. | 361/679.55 |
| 2009/0268398 | A1 * | 10/2009 | Tang | 361/679.55 |
| 2010/0002379 | A1 * | 1/2010 | Hadad et al. | 361/679.59 |
| 2010/0149752 | A1 * | 6/2010 | Lian | 361/679.59 |

* cited by examiner

*Primary Examiner* — Adrian S Wilson
(74) *Attorney, Agent, or Firm* — Novak Druce Connolly Bove + Quigg LLP

(57) ABSTRACT

An electronic device includes a main body and a support mechanism assembled within the main body, and a cover body. The main body defines an ejecting hole. The cover body is rotatably hinged to the main body for releasing the support mechanism, or for retracting the support mechanism into the main body when not required. The support mechanism includes a rotating member, a support member, and an elastic member. The rotating member is rotatably assembled within the main body and partially exposed from a top plate of the main body, the support member is assembled to the rotating member, a distal end of the support member aligns with one ejecting hole of the bottom plate, the elastic member is assembled within the main body and elastically resisting against the support member; the cover body resists against the rotating member in a folded state.

14 Claims, 4 Drawing Sheets

ELECTRONIC DEVICE WITH SUPPORT MECHANISM

BACKGROUND

1. Technical Field

The present disclosure generally relates to electronic devices, and more particularly, to an electronic device with a support mechanism.

2. Description of Related Art

Electronic devices such as notebook computers, tablet PCs and electronic books readers are portable and have a multiplicity of entertainment functions. In use, such an electronic device may be handheld, set on a desk or in a person's lap. This may not achieve an optimum display angle and is also often inconvenient. In order to solve the problem, a plurality of support mechanisms is provided to support the electronic device. However, these existing support mechanisms are complicated and relatively large, thus it is inconvenient to carry such support mechanisms.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
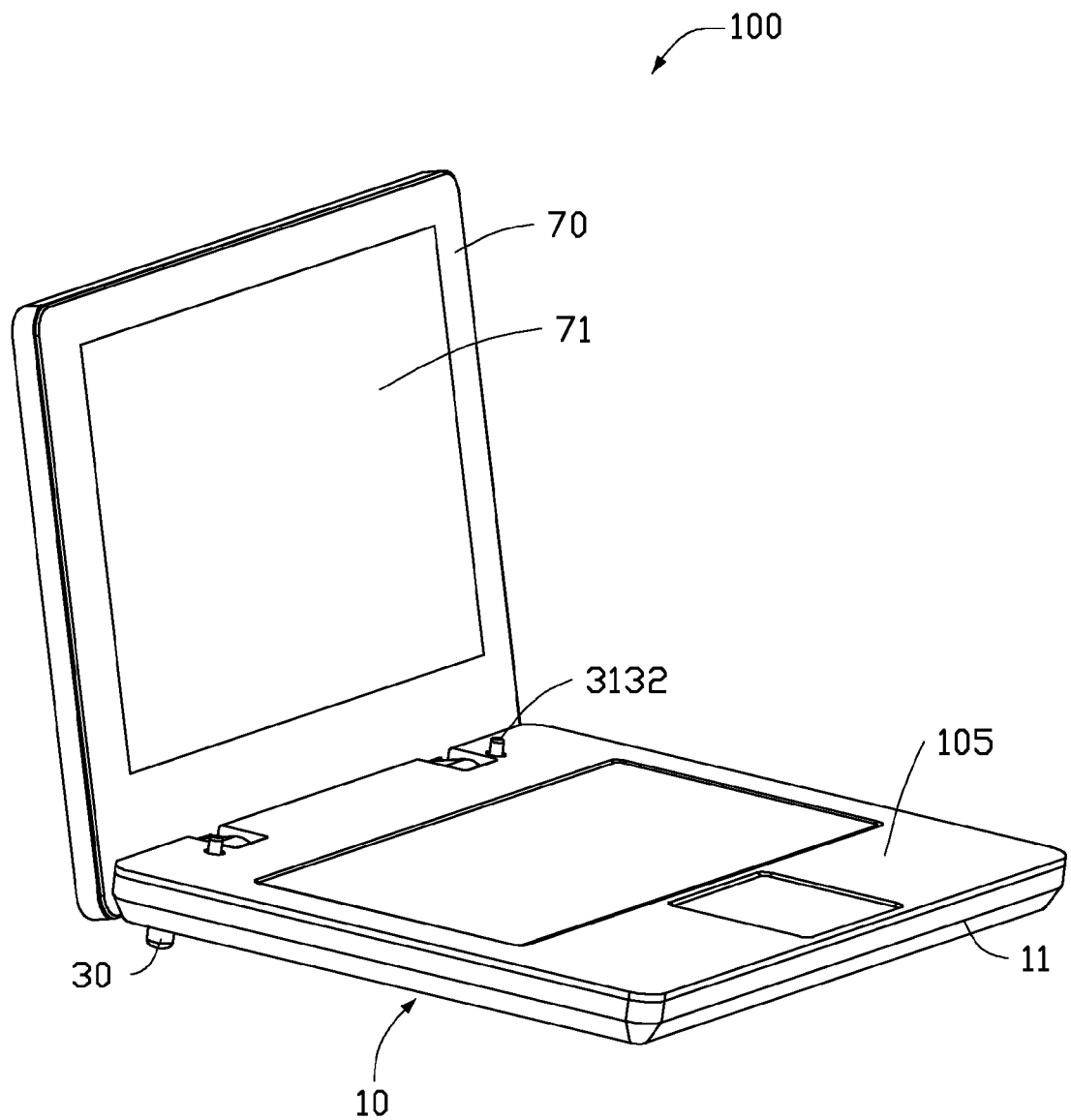
FIG. 1 shows an isometric view of an embodiment of an electronic device equipped with a support mechanism.

Referring to FIG. 1, an embodiment of an electronic device 100 includes a main body 10, two support mechanisms 30, and a cover body 70. The cover body 70 is rotatably hinged to the main body 10. The two support mechanisms 30 are separately assembled within the main body 10, and positioned adjacent to a back hinged end of the main body 10. The two support mechanisms 30 are capable of being ejected out from the main body 10 to support the main body 10. In the illustrated embodiment, the electronic device 100 is a foldable notebook computer.

The main body 10 includes a base housing 11 and a top plate 105 detachably mounted on the base housing 11. In the illustrated embodiment, the top plate 105 includes a keyboard portion.

Figure 2:
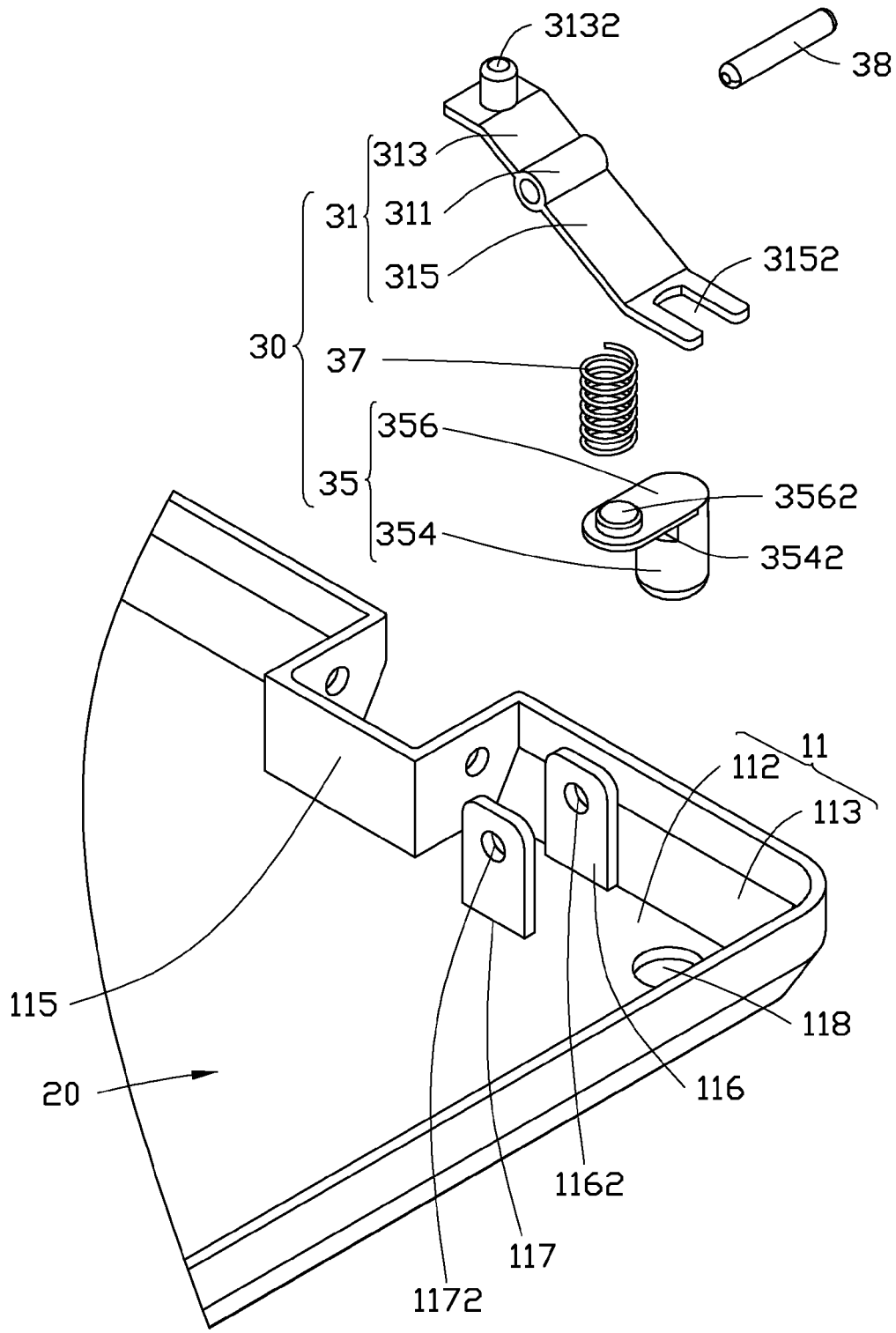
FIG. 2 shows a partial exploded, isometric view of the electronic device of FIG. 1.

Also referring to FIG. 2, the base housing 11 includes a substantially rectangular bottom plate 112 and a peripheral wall 113 extending and bending from a peripheral edge of the bottom plate 112. The bottom plate 112, the peripheral wall 113 and the top plate 105 cooperatively define a receiving space 20. Two hinged portions 115 are separately formed on the bottom plate 112 and positioned adjacent to a back side wall of the peripheral wall 113, for hinging with the cover body 70. In the illustrated embodiment, the two hinged portions 115 are both recessed from an outer surface of the back side wall of the peripheral wall 113 in substantially a U-shape. Two sides of the bottom plate 112 each forms a first hinged block 116 and a second hinged block 117 parallel to the first hinged block 116. The first hinged block 116 is positioned adjacent to and parallel to the back side wall of the peripheral wall 113, and defines a first pivotal hole 1162. The second hinged bock 117 is also parallel to the back side wall of the peripheral wall 113, and defines a second pivotal hole 1172 coaxial with the first pivotal hole 1162. There is an ejecting hole 118, positioned adjacent to the first hinged block 116 and the second hinged block 117 defined at both sides of the bottom plate 112.

Each support mechanism 30 includes a rotating member 31, a support member 35, and an elastic member 37. The rotating member 31 is positioned between and rotatably hinged to the first and second hinged blocks 116, 117. The rotating member 31 includes a pivotal body 311, a pressing portion 313 extending from a first side of the pivotal body 311, and a support portion 315 extending from an opposite second side of the pivotal body 311. The pivotal body 311 is sandwiched between the first and second hinged blocks 116, 117, and two ends of the pivotal body 311 are rotatably hinged to the first and second hinged blocks 116, 117. The pressing portion 313 is positioned adjacent to the hinged portion 115. A substantially cylindrical pressing post 3132 is formed on the pressing portion 313 and passes through the top plate 105 to be exposed from the top plate 105. The support portion 315 extends toward the ejecting hole 118 of the bottom plate 112, and defines a latching slot 3152 through a distal end of the support portion 315.

In the illustrated embodiment, the pivotal body 311 is a substantially hollow cylindrical body. The support mechanism 30 further comprises a pivotal shaft 38. The pivotal shaft 38 passes through the pivotal body 311, with two ends of the pivotal shaft 38 hinged to the first pivotal hole 1162 of the first hinged block 116 and the second pivotal hole 1172 of the second hinged block 117, such that the rotating member 31 is rotatably hinged to the base housing 11 and positioned adjacent to the hinged portion 115.

The support member 35 is assembled to the distal end of the support portion 315, received within the main body 10, and positioned above the ejecting hole 118 of the bottom plate 112. The support member 35 includes a substantially cylindrical support leg 354 and an assembling portion 356 extending from a first end of the support leg 354. A latching portion 3542 is defined at the first end of the support leg 354, and positioned adjacent to the assembling portion 356, for latching with the latching slot 3152 of the support portion 315. In use, the support leg 354 of the support member 35 is capable of being partially ejected out by passing through the ejecting hole 118 of the bottom plate 112, and being exposed to the outside of the bottom of the main body 10, to support the whole electronic device 100. The support leg 354 of the support member 35 is also capable of being retracted back and received within the main body 10 when the cover body 70 is rotated and overlapped on the main body 10. A mounting post 3562 is formed on the assembling portion 356 away from the support leg 354, for mounting the elastic member 37.

The elastic member 37 is a coil spring in the illustrated embodiment, a first end of the elastic member 37 is sleeved on the mounting post 3562 and resists against the assembling portion 356. A second end of the elastic member 37 elastically resists against the top plate 105, for providing an elastic force to drive the support member 35 to return back to its original position, and be received within the main body 10 of the electronic device 100, when not in use.

Also referring to FIG. 1, the cover body 70 has a display screen 71. The cover body 70 is rotatably hinged to the hinged portions 115 of the main body 10 for releasing the support mechanism 30 to support the whole electronic device 100 when in a state of use, or retracting the support mechanism 30 thereby keeping the support mechanism 30 completely received within the main body 10 when the electronic device 100 is not in use.

Figure 3:
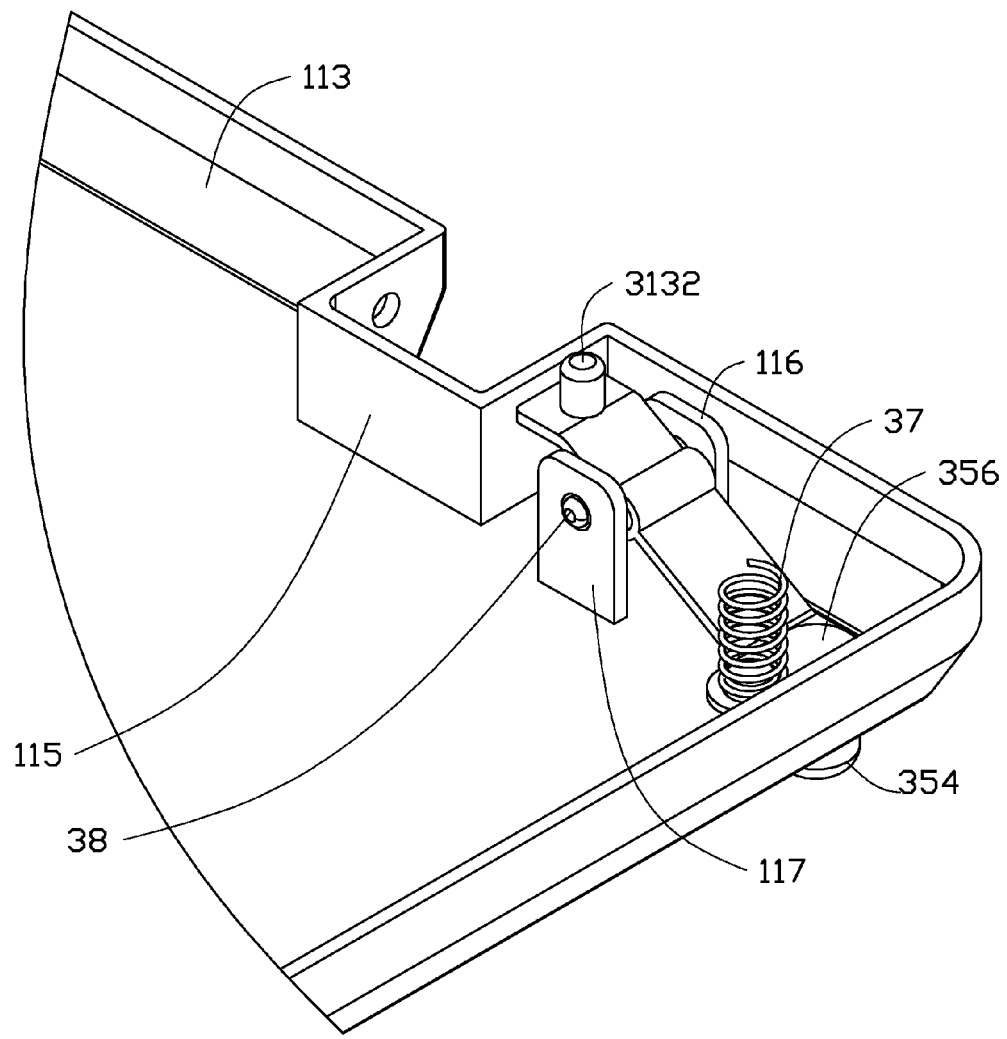
FIG. 3 shows an assembled isometric view of the electronic device of FIG. 2.
Figure 4:
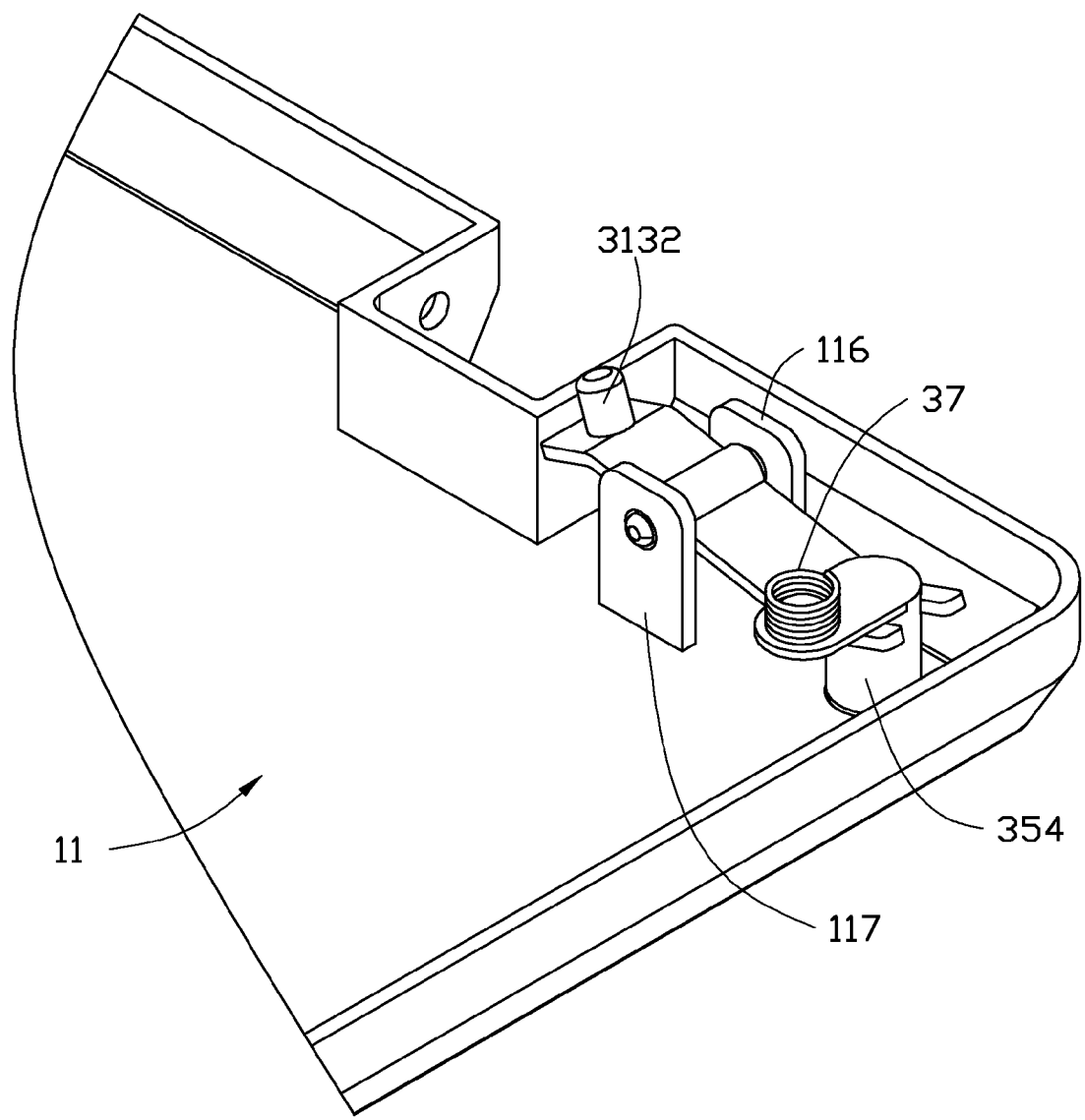
FIG. 4 is similar to FIG. 3, and shows the electronic device in use.

Also referring to FIG. 3, when assembling the electronic device 100, the rotating member 31 is rotatably hinged to the first and second hinged blocks 116, 117 by the pivotal shaft 38. The pivotal shaft 38 passes through the pivotal body 311, with two ends of the pivotal shaft 38 hinged to the first pivotal hole 1162 of the first hinged block 116 and the second pivotal hole 1172 of the second hinged block 117. The support member 35 is assembled to the distal end of the support portion 315 with the latching portion 3542 latching with the latching slot 3152 of the support portion 315. The support leg 354 of the support member 35 partially passes through the ejecting hole 118 of the bottom plate 112 and is exposed from the bottom of the base housing 11. The elastic member 37 is sleeved on the mounting post 3562 with the first end thereof resisting against the assembling portion 356, and the second end thereof facing upwards, away from the bottom plate 112. The top plate 105 is mounted on the base housing 11 and positioned above the bottom plate 112. The second end of the elastic member 37 elastically resists against the top plate 105. The pressing post 3132 of the rotating member 31 passes through and is exposed from a top surface of the top plate 105. Finally, the cover body 70 is hinged to the hinged portions 115 of the main body 10 to finish the assembly of the electronic device 100. When the electronic device 100 is in a folded and unused state, the cover body 70 is covered on the main body 10 and resists again the pressing posts 3132 towards the bottom plate 112 of the main body 10, thereby preventing the rotating member 31 from rotating, and maintaining the support legs 354 received within the main body 10.

In use, when rotating the cover body 70 away from the main body 10 by unfolding the cover body 70, the pressing posts 3132 are released and moved upwards under the elastic force generated by the elastic members 37. Meanwhile, the rotating members 31 are rotated and the support legs 354 are ejected out from the bottom plate 112, by passing through the ejecting holes 118 of the bottom plate 112, to be exposed from the bottom of the main body 10, and thus providing support for the whole electronic device 100. When rotating the cover body 70 toward the main body 10 for folding the cover body 70, the cover body 70 resists against the pressing posts 3132 toward the bottom plate 112 of the main body 10; and meanwhile, the rotating members 31 are rotated, thereby driving the support legs 354 to retract back into the main body 10 and keep the support legs 354 received within the main body 10. The elastic members 37 are compressed and elastically sandwiched between the top plate 105 and the assembling portion 356.

It is to be noted that, the number of support mechanisms 30 is not limited to two, there may be only one or more than two according to actual need. Meanwhile, neither is the number of hinged portions 115 limited to two, there may be only one or more than two according to actual need.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device comprising:
   a main body comprising a bottom plate, the bottom plate defining at least one ejecting hole;
   at least one support mechanism assembled within the main body, the at least one support mechanism comprising:
      a rotating member rotatably assembled within the main body and partially exposed from the main body;
      a support member assembled to the rotating member, a distal end of the support member aligning with one corresponding ejecting hole of the bottom plate; and
      an elastic member assembled within the main body and elastically resisting against the support member; and
   a cover body rotatably hinged to the main body for releasing the at least one support mechanism to support the electronic device in a using state, and retracting the at least one support mechanism for thereby keeping the at least one support mechanism completely received within the main body when the electronic device is in an unused state; wherein, the cover body resists against the rotating member in a folded state; and in an unfolded state, the distal end of the support member is ejected out of the main body from the corresponding one ejecting hole under a force of the elastic member, and the rotating member does not attach to the cover body.

2. The electronic device of claim 1, wherein the main body comprises a base housing and a top plate mounted on the base housing, the rotating member comprises a pressing portion exposed from the top plate for resisting against the cover body in the unused state, the elastic member is elastically sandwiched between the support member and the top plate.

3. The electronic device of claim 2, wherein the rotating member comprises a pivotal body, the pressing portion extending from a first side of the pivotal body, and a support portion extending from an opposite second side of the pivotal body; the pressing portion comprises a pressing post formed on the pressing portion and exposed from the top plate by passing through the top plate, the support member is detachably assembled to the support portion of the rotating member and aligns with the corresponding ejecting hole of the bottom plate.

4. The electronic device of claim 3, wherein the support portion defines a latching slot, the support member comprises a support leg and an assembling portion extending from a first end of the support leg, a second end of the support leg aligns with the ejecting hole; a latching portion is defined at the first end of the support leg, and latches with the corresponding latching slot of the support portion; two ends of the elastic member respectively resists against the top plate and the assembling portion.

5. The electronic device of claim 4, wherein the assembling portion comprises a mounting post formed on the assembling portion away from the support leg and facing toward the top plate; the elastic member is sleeved on the mounting post.

6. The electronic device of claim 3, wherein the bottom plate forms a first hinged block and a second hinged block parallel to the first hinged block, the rotating member is positioned between the first and second hinged blocks, two ends of the pivotal body are rotatably hinged to the first and second hinged blocks, respectively.

7. The electronic device of claim 6, wherein the pivotal body is a substantially hollow cylindrical body, the at least one support mechanism further comprises a pivotal shaft, the pivotal shaft passes through the pivotal body, with two ends of the pivotal shaft respectively hinged to the first hinged block and the second hinged block.

8. The electronic device of claim 2, wherein the base housing further comprises a peripheral wall extending and bending from a peripheral edge of the bottom plate, and at least one hinged portion formed on the bottom plate and positioned adjacent to a back side wall of the peripheral wall; the cover body is rotatably hinged to the at least one hinged portion of the base housing.

9. An electronic device comprising:
a main body comprising a base housing and a top plate mounted on the base housing, the base housing comprising a bottom plate and defining two ejecting holes through the bottom plate; and
two support mechanisms oppositely assembled within the main body, and
a cover body rotatably hinged to the main body for releasing the two support mechanisms to support the electronic device in a using state, and retracting the support mechanism for thereby keeping the two support mechanisms completely received within the main body when the electronic device is in an unused state;
wherein, each support mechanism comprises a rotating member, a support member, and an elastic member; the rotating member is rotatably assembled within the main body and partially exposed from the top plate of the main body, the support member is assembled to the rotating member, a distal end of the support member aligns with one corresponding ejecting hole of the bottom plate, the elastic member is assembled within the main body and elastically resisting against the support member; the cover body resists against the rotating member in a folded state; in an unfolded state, the distal end of the support member extends out of the main body from the corresponding one ejecting hole under a force of the elastic member, and a gap exists between the cover body and the rotating member.

10. The electronic device of claim 9, wherein, the rotating member comprises a pivotal body, a pressing portion extending from a first side of the pivotal body, and a support portion extending from an opposite second side of the pivotal body; the pressing portion comprises a pressing post formed on the pressing portion and exposed from the top plate by passing through the top plate, the support member is detachably assembled to the support portion of the rotating member and aligns with the corresponding ejecting hole of the bottom plate.

11. The electronic device of claim 10, wherein the support portion defines a latching slot, the support member comprises a support leg and an assembling portion extending from a first end of the support leg, a second end of the support leg aligns with the ejecting hole; a latching portion is defined at the first end of the support leg, and latches with the corresponding latching slot of the support portion; two ends of the elastic member respectively resists against the top plate and the assembling portion.

12. The electronic device of claim 11, wherein the assembling portion comprises a mounting post formed on the assembling portion away from the support leg and facing toward the top plate; the elastic member is sleeved on the mounting post.

13. The electronic device of claim 12, wherein the bottom plate forms a first hinged block and a second hinged block parallel to the first hinged block, the rotating member is positioned between the first and second hinged blocks, two ends of the pivotal body are rotatably hinged to the first and second hinged blocks, respectively.

14. The electronic device of claim 13, wherein the pivotal body is a substantially hollow cylindrical body, each support mechanism further comprises a pivotal shaft, the pivotal shaft passes through the pivotal body, with two ends of the pivotal shaft respectively hinged to the first hinged block and the second hinged block.

* * * * *